United States Patent [19]

Raj et al.

[11] Patent Number: 5,018,751

[45] Date of Patent: May 28, 1991

[54] STACKED POLE-PIECE FERROFLUID SEAL APPARATUS

[75] Inventors: Kuldip Raj, Merrimack; Ronald Moskowitz, Hollis, both of N.H.; Joseph Moses, Tyngsboro, Mass.; James Bonvouloir, Nashua; Frank Bloom, Windham, both of N.H.

[73] Assignee: Ferrofluidics Corporation, N.H.

[21] Appl. No.: 373,328

[22] Filed: Jun. 28, 1989

[51] Int. Cl.$^5$ .............................................. F16J 15/40
[52] U.S. Cl. ...................................... 277/80; 277/135
[58] Field of Search .................. 277/80, 135; 384/133

[56] References Cited

U.S. PATENT DOCUMENTS

| | | | |
|---|---|---|---|
| 4,357,021 | 11/1982 | Raj et al. | 277/80 |
| 4,407,508 | 10/1983 | Raj et al. | 277/80 |
| 4,506,895 | 3/1985 | Raj et al. | 277/80 |
| 4,545,587 | 10/1985 | Higgins | 277/80 |
| 4,628,384 | 12/1986 | Raj et al. | 277/80 |
| 4,692,826 | 9/1987 | Raj et al. | 360/97 |
| 4,772,032 | 9/1988 | Raj et al. | 277/80 |
| 4,842,426 | 6/1989 | Furumura et al. | 384/133 |
| 4,890,850 | 1/1990 | Raj et al. | 277/80 |

FOREIGN PATENT DOCUMENTS

| | | | |
|---|---|---|---|
| 0135269 | 10/1980 | Japan | 277/80 |
| 0222668 | 11/1985 | Japan | 277/80 |
| 655858 | 9/1979 | U.S.S.R. | |

OTHER PUBLICATIONS

U.S. patent application 182,510, filed 4/18/88, entitled *Tapered Ferrofluid Seal*.

*Primary Examiner*—Thomas B. Will
*Assistant Examiner*—Daniel G. DePumpo
*Attorney, Agent, or Firm*—Wolf, Greenfield & Sacks

[57] ABSTRACT

A long-life, stacked pole-piece magnetic fluid seal for sealing between a housing and magnetically permeable shaft, in one embodiment is comprised of an annular magnet, having poles of opposite polarity on first and second end surfaces thereof, an annular, magnetically permeable primary pole-piece axially abutting the first end surface of the magnet, and one or more annular, magnetically permeable secondary pole-pieces stacked axially adjacent the primary pole-piece and separated therefrom and from each other by one or more annular spacers which define intermediate spaces between the pole-pieces. The pole-pieces are in a closely-spaced, non-contacting relationship with the shaft to define one or more radial gaps which, in conjunction with the intermediate spaces collectively form an annular ring in which a magnetic fluid is disposed and retained. In a second embodiment, the annular magnet is separated from the primary pole piece by a spacer which defines an intermediate space therebetween. The magnet and primary pole-piece are in closely-spaced, non-contacting relationships with the shaft to define first and second gaps respectively, which, in conjunction with the intermediate space, collectively form an annular ring in which a magnetic fluid is disposed and retained.

17 Claims, 3 Drawing Sheets

STACKED POLE-PIECE FERROFLUID SEAL APPARATUS

FIELD OF THE INVENTION

The present invention relates to an extended-life magnetic fluid seal, and more particularly, to a ferrofluid exclusion seal having one or more annular pole-pieces stacked in a magnetic flux relationship with an annular permanent magnet. The ferrofluid seal of the present invention is useful as an exclusion seal for a computer-disk-drive spindle, but is not limited to such use.

BACKGROUND OF THE INVENTION

Ferrofluid-type seal apparatus are well known and are typically designed to provide a seal about a rotatable shaft to protect the environment on one side of the shaft from contaminants of the environment on the other side of the shaft. Ferrofluid-type exclusion seals are particularly useful with computer-disk-drive spindles to prevent contaminating materials from reaching the disk memory area.

A standard ferrofluid exclusion seal typically comprises an annular, axially polarized permanent magnet adapted to surround a shaft. The magnet is flanked by one or more pole-piece elements which are placed in a contacting magnetic-flux relationship with the polar ends of the permanent magnet. The pole-piece elements are also annular in shape and extend into a close, non-contacting relationship with the surface of the shaft to form radial gaps therebetween. A magnetic fluid or ferrofluid is disposed and magnetically retained in the radial gaps upon insertion of a magnetically permeable shaft, to form one or more liquid O-rings about the shaft which serve to form an exclusion seal.

Many variations to the basic ferrofluid seal have been made to extend the seal life and to reduce the axial length of the seal. U.S. Pat. No. 4,357,021, issued Nov. 2, 1982 to Raj et. al., discloses a seal which utilizes two pole-pieces of unequal width. The ferrofluid under the thinner pole-piece evaporates and forms an air gap while the ferrofluid at the wider, tapered gap remains, providing for extended seal life. Although this configuration exhibits an improved seal life, it is inadequate for applications, such as disk drives, which operate at high ambient temperatures, since the quantity of ferrofluid retained in the gaps between the pole-pieces and the shaft is relatively small.

A prior art seal which has a reduced axial length is disclosed in U.S. Pat. No. 4,407,508, issued Oct. 4, 1983 to Raj et. al. In this patent, a single pole-piece surrounds the shaft to be sealed, and an annular permanent magnet, secured to one surface of the pole-piece. In an alternate embodiment, the single pole-piece has a series of ridges forming a plurality of sealing stages between the pole-piece inner diameter surface and the shaft. Unfortunately, the volume of ferrofluid retained by either embodiment is relatively small. Furthermore, in either embodiment, substantial magnetic flux leakage occurs between the shaft and the magnet, ultimately effecting the seal pressure capacity at the pole-piece.

U.S. Pat. No. 4,506,895, issued Mar. 26, 1985 to Raj, discloses a self-activating, short axial length ferrofluid seal comprising two annular pole-pieces surrounding a thin, large diameter annular magnet. The ferrofluid occupying the gap between the pole-pieces and the permanent magnet forms a sectional, T shaped O-ring seal. Although the seal is self activating and has a short axial length, the life of the seal is again limited by the relatively small amount of ferrofluid in the seal. Furthermore, unless the magnet/pole-piece interfaces are hermetically bonded, fluid leakage is likely to occur at the interfaces.

U.S. Pat. No. 4,628,384, issued Dec. 9, 1986 to Raj et. al., discloses a bearing assembly having an integrated, single pole-piece ferrofluid seal incorporated therein. The annular permanent magnet of the seal has a sectional L-shape which supports the single annular pole-piece. As with prior art exclusion seals, the limited amount of ferrofluid retained by the seal limits the seal life.

U.S. Pat. No. 4,772,032, issued Sept. 20, 1988 to Raj et. al., discloses a compact magnetic fluid low pressure seal in which a bearing assembly is stacked intermediate a single pole-piece and either a radially or axially polarized magnet. As with the other prior art seals, the amount of ferrofluid retained in the seal is relatively small and therefore limits the life of the seal. Furthermore, the above apparatus cannot be used for short axial length applications.

U.S. patent application Ser. No. 07/182,510, filed Apr. 18, 1988, which is copending and co-owned, discloses a two pole tapered magnetic fluid seal which is axially adjacent a magnetically permeable bearing assembly and separated therefrom by a non-magnetic annular spacer. The pole-pieces of the seal axially abut the magnet, with the inner-diameter surfaces of the pole-pieces and magnet tapering linearly to retain the magnetic fluid. Although the seal is capable of retaining an increased quantity of magnetic fluid, the magnet/pole-piece interfaces must be hermetically bonded to prevent magnetic fluid loss.

A further drawback of prior art two-pole magnetic fluid seals is that they cannot be conveniently and reliably filled with both radial gaps activated. In a conventional two pole seal, in order to activate both gaps, the magnetic fluid is added in the magnet region followed by insertion of the shaft into the magnetic assembly. This technique leads to an unequal distribution of magnetic fluid in the radial gaps forming the seals. Furthermore, a quantity of unused fluid is left in the magnet region.

Accordingly, it is therefore an object of the present invention to provide an improved magnetic fluid seal which is capable of retaining a relatively large volume of magnetic fluid thereby extending the seal life.

A further object of the invention is to provide a magnetic fluid seal which reduces fluid leakage between the magnet/pole-piece interface and which eliminates the need to hermetically bond the magnet and pole-piece together.

Another object of the present invention is to provide a long-life magnetic fluid seal which can be utilized in short axial length applications.

A further object of the present invention is to provide a long-life magnetic fluid seal in which the static pressure of the seal changes minimally over an extended time.

Yet another object of the present invention is to provide a magnetic fluid seal which has a low magnetic fluid maniscus despite increased magnetic fluid volume in the seal.

Still a further object of the present invention is to provide a seal assembly which enables convenient and accurate activating of the gaps of multiple pole-pieces with a magnetic fluid.

SUMMARY OF THE INVENTION

The foregoing and other objects of the present invention are achieved with a compact long-life magnetic fluid seal for sealing between a housing and a magnetically permeable shaft. The magnetic fluid seal of the present invention comprises one or more annular pole-pieces stacked axially adjacent an annular permanent magnet.

According to one embodiment of the present invention, a magnetic fluid seal comprises an annular axially polarized magnet having poles of opposite polarity at first and second surfaces thereof. The annular magnet has a closely-spaced, non-contacting relationship with the magnetically permeable shaft. A first annular, magnetically permeable pole-piece axially abuts the first surface of the magnet. The pole-piece is in a closely-spaced, non-contacting relationship with the shaft to define a first radial gap. A similar, second annular pole-piece is positioned axially adjacent the first pole-piece but is separated therefrom by an annular, non-magnetic spacer which defines an intermediate air gap between the pole-pieces. The second pole-piece is in a closely-spaced, non-contacting relationship with the shaft to define a second radial gap.

The first and second radial gaps and intermittent gap collectively define an annular space in which a relatively large volume of magnetic fluid is disposed and retained by the magnetic flux path extending through the magnetic seal assembly and the shaft.

A variation to the first embodiment of the present invention includes, an third annular pole-piece disposed axially adjacent the second pole-piece and separated therefrom by a non-magnetic spacer which defines a second intermediate gap between the second and third pole-pieces. The third pole-piece is in a closely-spaced, non-contacting relationship with the shaft to define a third radial gap therebetween. In this variation, the magnetic fluid is disposed in and occupies the first, second and third radial gaps, and partially occupies the first and second intermediate gaps between the pole-pieces.

Other variations to the first embodiment of the present invention include means to reduce magnetic flux leakage between the shaft and the magnetic seal assembly such as a third annular pole-piece, axially abutting the second surface of the magnet, or a magnetically permeable bearing assembly axially adjacent the second surface of the magnet but separated therefrom by a magnetically permeable spacer.

In a second embodiment of the present invention a magnetic fluid seal comprises an annular magnet having poles of opposite polarity at first and second surfaces thereof. The magnet is in a closely spaced, non-contacting relationship with the shaft to define a first radial gap therebetween. A first annular, magnetically permeable pole-piece is disposed axially adjacent the first surface of the magnet and is separated therefrom by an annular non-magnetic spacer which defines an intermediate air gap between the magnet and the pole-piece. The first pole-piece is in a closely-spaced, non-contacting relationship with the shaft to define a second radial gap therebetween. The first and second radial gaps and the intermediate gap collectively define an annular space in which a relatively large volume of magentic fluid is disposed and retained by the magnetic flux path which extends through the magnetic seal assembly and the shaft.

A variation to the second embodiment of the present invention includes a magnetically permeable bearing assembly axially disposed adjacent the second surface of the magnet and separated therefrom by an annular, non-magnetic spacer to reduce magnetic flux leakage between the magnetic seal and the shaft.

The invention will be more fully understood from the detailed description set forth below, which should be read in conjunction with the accompanying drawings. The invention is defined in the claims appended at the end of the detailed description, which is offered by way of example only.

BRIEF DESCRIPTION OF THE DRAWINGS

For a better understanding of the present invention together with other and future objects, advantages and capabilities thereof, references are made to the accompanying drawings, which are incorporated herein by reference and in which.

DETAILED DESCRIPTION OF THE INVENTION

Figure 1:
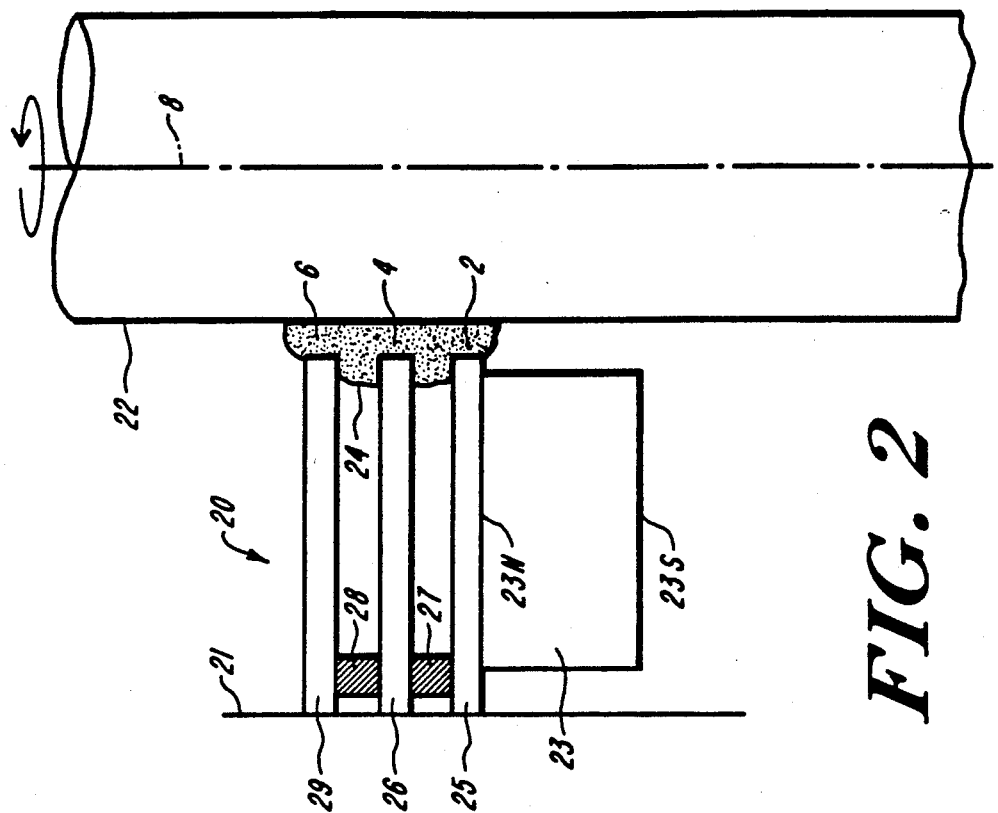
FIG. 1 is one half of a cross sectional view of a stacked, two-pole magnetic fluid seal in accordance with a first embodiment of the present invention.

Referring to the drawings, and in particular FIG. 1, a magnetic fluid seal 10, coupled between housing 11 and a magnetically permeable shaft 12, is illustrated. It will be understood that seal 10 is axially symetric about axis 8.

Seal 10 is comprised of magnet 13, first pole-piece 15, second pole-piece 16, spacer element 17, and magnetic fluid 14. Magnet 13 is an annular, axially polarized, permanent magnet having poles of opposite polarity at surfaces 13N and 13S thereof. Magnet 13 is axially aligned with shaft 12 as illustrated. The inner-diameter surface of magnet 13 is in a closely-spaced, non-contacting relationship with shaft 12. In the preferred embodiment, magnet 13 has an axial length of between 0.010 inches and 0.100 inches, with approximately 0.030 inches being the preferred axial length. Magnet 13 may be an electrically conducting as well as non-conducting magnetic and may be comprised of ferrites, Alnico compounds, metallic Sm—Co and Nd—Fe—B as well as bonded Sm—Co and Nd—Fe—B. In the preferred embodiment, magnet 13 has an energy product of between 1.0 and 25 MegaGauss-Oersteds.

A first annular, magnetically permeable pole-piece 15 axially abuts surface 13N of magnet 13, as shown in FIG. 1. The inner-diameter surface of first pole-piece 15 is in a closely-spaced, non-contacting relationship with shaft 12 to define a radial gap 2 therebetween. The outer-diameter surface of first pole-piece 15 is mechanically coupled to the preferably metallic wall of housing 11. A second annular, magnetically permeable pole-piece 16 is positioned axially adjacent first pole-piece 15 and separated therefrom by an annular, non-magnetic spacer 17. The inner-diameter surface of second pole-piece 16 has a closely-spaced, non-contacting relationship with shaft 12 to define a radial gap 4 therebetween. As with first pole-piece 15, the outer-diameter surface of second pole-piece 16 is mechanically coupled to the wall of housing 11. In the preferred embodiment, pole-pieces 15 and 16 have an axial length of between 0.005 inches and 0.060 inches, with 0.01 inches being the preferred axial length. The preferred axial length of spacer 17 and the intermediate gap between pole-pieces 15 and 16 is between 0.002 inches and 0.015 inches, with 0.010 inches being the preferred spacing length. In the preferred embodiment, spacer 17 is comprised of plastic or aluminum and is positioned along outer-diameters of the pole-pieces. Also, the preferred width of radial gaps 2 and 4 is between 0.002 inches and 0.010 inches, with the preferred radial gap width being 0.006 inches.

In the first embodiment of the present invention, radial gaps 2 and 4 and the intermittent gap between pole-pieces 15 and 16 form an annular gap in which magnetic fluid 14 is disposed and retained. As shown in FIG. 1, magnetic fluid 14 occupies radial gaps 2 and 4 and partially occupy the intermediate gap. In the preferred embodiment, magnetic fluid 14 is a ferrofluid of the following types: esters, hydrocarbons, fluorocarbons, polyphenyl ethers, silicones, glycols, or fluorosilicones. The magnetic fluid 14 of the present invention may be electrically conducting, as well as non-conducting depending on the application. The viscosity of magnetic fluid 14 is preferably between 20 and 500 cps at 27° C., with 240 cps being the preferred viscosity. The preferred saturation magnetization of magnetic fluid 14 is between 50 and 500 Gauss, with 200 Gauss being the preferred magnetization saturation. Also, the preferred evaporation rate of magnetic fluid 14 is typically very low, such as $4-10^9$ gm/cm$^2$−sec @ 80° C. or lower.

Magnetic fluid 14 is retained in the annular gap by the magnetic flux path 19 which extends from annular magnet 13 through first and second pole-pieces 15 and 16, radial gaps 2 and 4, magnetically permeable shaft 12, and the air gap intermediate shaft 12 and surface 13S of magnet 13, as indicated in FIG. 1.

Figure 2:
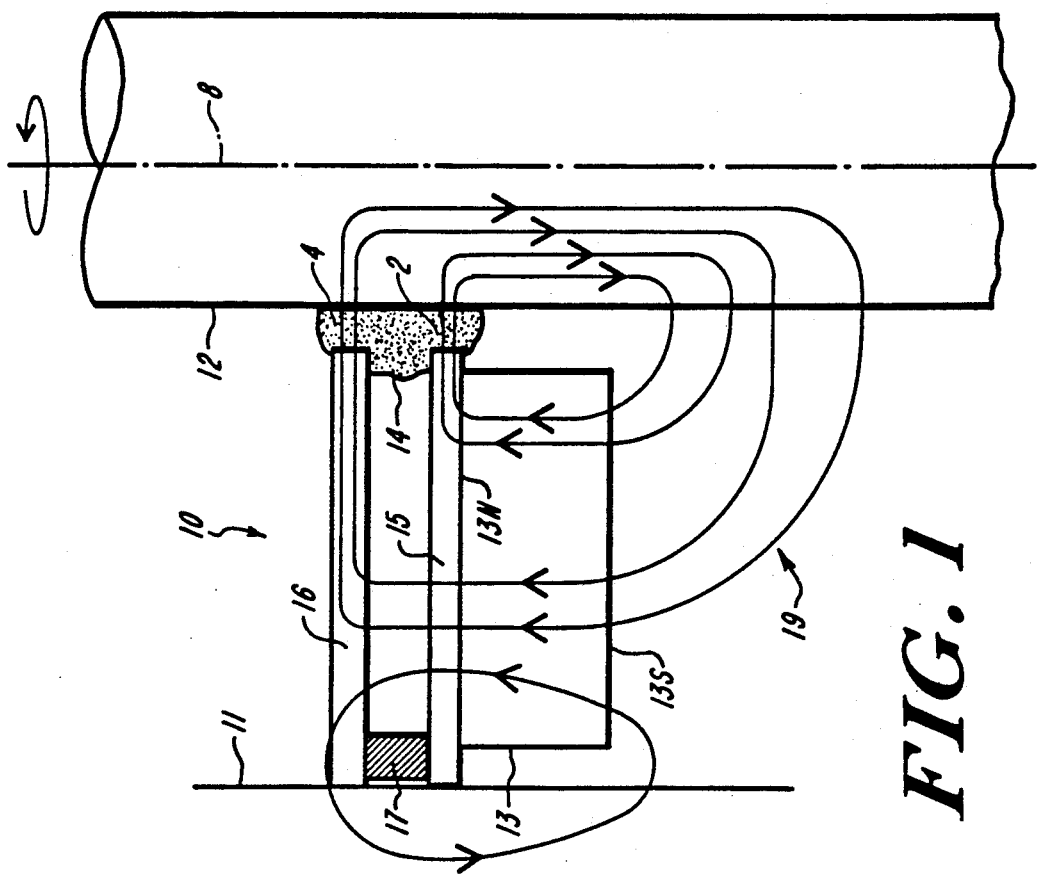
FIG. 2 is one half of a cross sectional view of the magnetic fluid seal of FIG. 1 in which a third pole-piece and non-magnetic spacer are added to form a stacked, three-pole magnetic seal in accordance with the present invention.

FIG. 2 illustrates magnetic fluid seal 20 which is a variation of the first embodiment of the present invention. Magnetic fluid seal 20 is coupled between housing 21 and magnetically permeable shaft 22. Magnetic seal 20 is comprised of magnet 23, first pole-piece 25, second pole-piece 26, spacer 27, and magnetic fluid 24, which have similar dimensions, arrangement, composition and function as magnet 13, first pole piece 15, second pole piece 16, spacer 17 and magnetic fluid 14 of magnetic seal 10, respectively. Magnetic seal 20 is further comprised of a third annular, magnetically permeable pole-piece 29 which is positioned axially adjacent second pole-piece 26 and separated therefrom by an annular, non-magnetic spacer 28, which defines a second intermediate air gap between second pole-piece 26 and third pole-piece 29. In the preferred embodiment, second spacer 28 is identical in composition and dimensions to first spacer 27 and is preferably positioned along the outer diameters of the pole-pieces. As with pole-pieces 25 and 26, the outer diameter surface of third pole-piece 29 is mechanically coupled to the wall of housing 21. The inner diameter surface of third pole-piece 29 is in a closely-spaced, non-contacting relationship with shaft 22 to define a radial gap 6 therebetween, similar to radial gaps 2 and 4 formed at pole-pieces 25 and 26, respectively.

As shown in FIG. 2, radial gaps 2, 4, and 6 together with the intermediate gaps form an annular space in which magnetic fluid 24 is disposed and retained. Magnetic fluid 24 occupies gaps 2, 4, and 6 and partially occupies the intermediate gaps therebetween. The magnetic fluid is retained in the annular space by the magnetic flux path extending through seal 20 and magnetically permeable shaft 22. Magnetic fluid 24 is similar in composition as magnetic fluid 14 of seal 10.

The axial lengths of magnetic seals 10 and 20 are comparable to conventional magnetic fluid seal, in which the pole-pieces flank the magnet, due to the decreased axial length of the pole-pieces. However, magnetic seals 10 and 20 are capable of accommodating larger volumes of magnetic fluid due to the presence of magnetic fluid in the intermediate gaps between the pole-pieces, as well as in the radial gaps between the pole-pieces and the shaft.

The magnetic circuits of seals 10 and 20 are not completely closed, with magnetic flux leakage occuring between the shaft and the magnetic seal assembly. As a result, the pressure capacities of seals 10 and 20 are between 0.2 and 2.0 psi. In both seal 10 and 20, the magnetic flux has a greater concentration in gap 2 in comparison with gaps 4 of seal 10 and gaps 4 and 6 of seal 20. The seal pressure capacities of seals 10 and 20 may be increased by completing the magnetic circuits of the seals, thereby reducing the magnetic flux leakage and increasing the seal pressure capacity at gap 2 of the first pole-piece.

Figure 3:
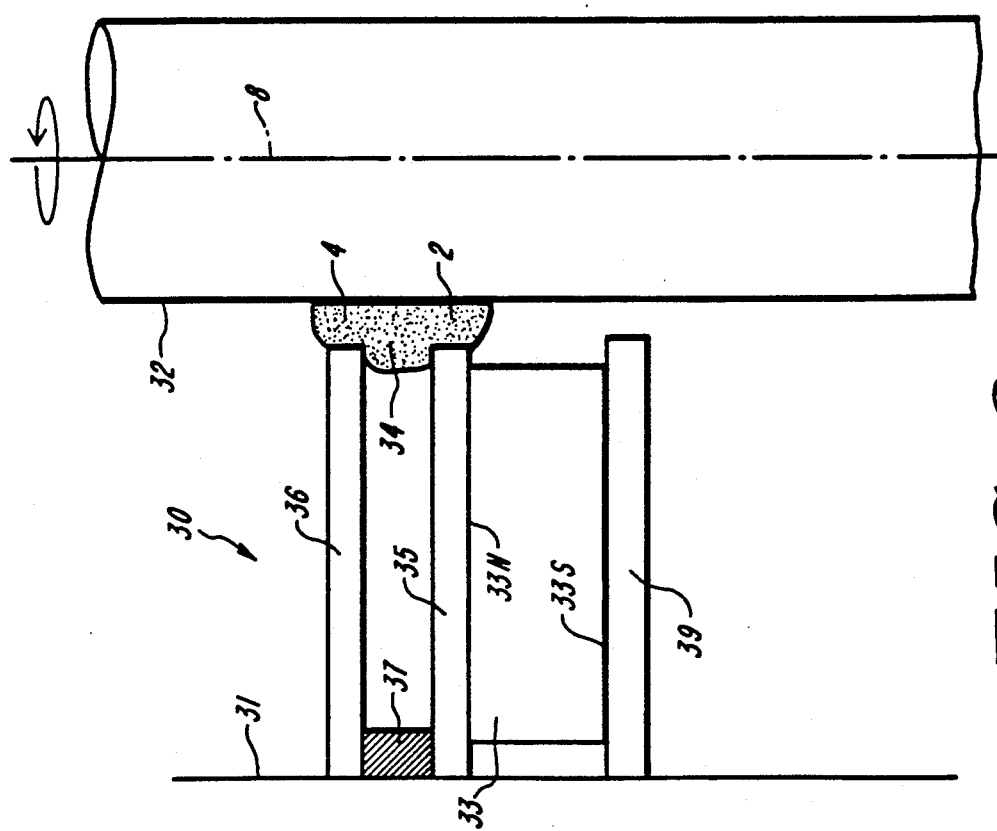
FIG. 3 is one half of a cross sectional view of the magnetic fluid seal of FIG. 1 in which an additional third pole-piece is utilized to reduce magnetic flux leakage.

Magnetic fluid seal 30 of FIG. 3 illustrates a means for completing the magnetic circuit of the magnetic fluid seal of the present invention. Seal 30 is coupled intermittent housing 31 and magnetically permeable shaft 32. Seal 30 is comprised of annular magnet 33, first pole-piece 35, spacer 37, second pole-piece 36 and magnetic fluid 34 which have similar dimensions, arrangement, composition, and function as magnet 13, first pole-piece 15, spacer 17, second pole-piece 16 and magnetic fluid 14 of seal 10, respectively. As shown in FIG. 3, seal 30 further comprises a third annular, magnetically permeable pole-piece 39 which axially abuts surface 33S of magnet 33. The outer-diameter surface of third pole-piece 39 is mechanically coupled to the wall of housing 31. The inner diameter surface of third pole-piece 39 is in closely spaced, non-contacting relationship with shaft 32, however, no magnetic fluid is retained in the gap formed therebetween. As stated above, the purpose of third pole-piece 39 is to complete the magnetic circuit formed between the seal assembly and shaft 32, thereby increasing the relative seal pressure capacity at gap 2.

Figure 4:
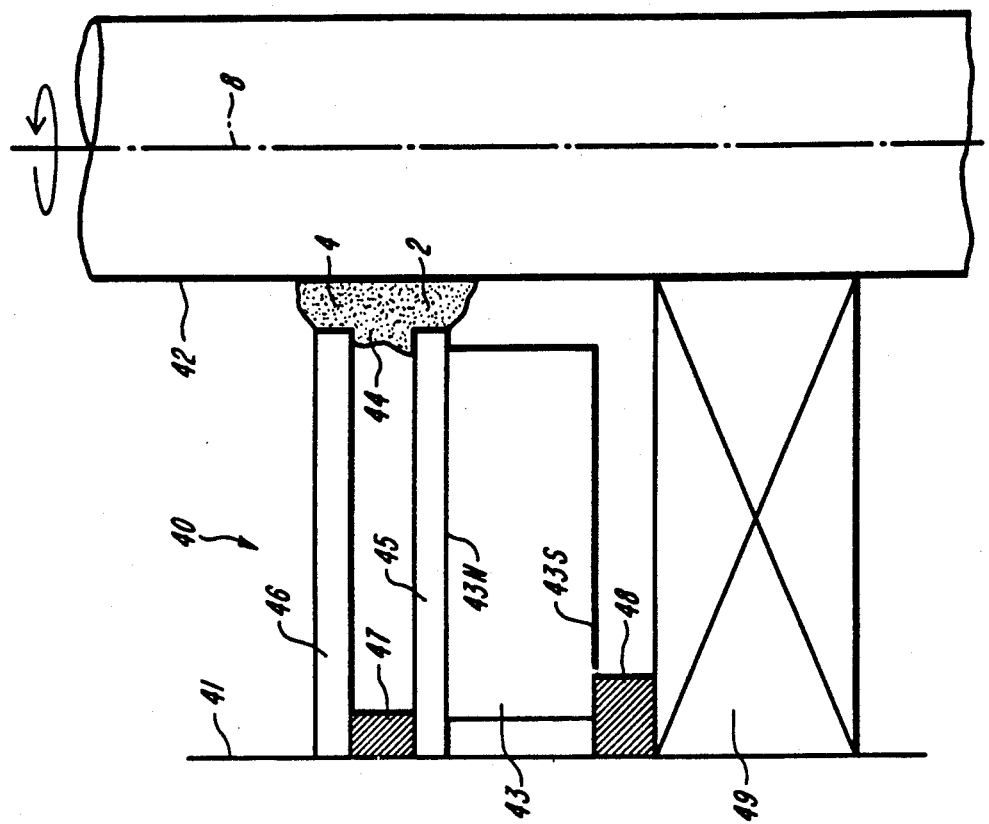
FIG. 4 is one half of a cross sectional view of the magnetic fluid seal of FIG. 1 in which a bearing assembly and spacer are utilized to reduce magnetic flux leakage.

Magnetic seal 40, as shown in FIG. 4, provides an alternate means for closing the magnetic circuit of the magnet fluid seals of the present invention. Magnetic fluid seal 40 is coupled intermediate housing 41 and shaft 42. Seal 40 is comprised of magnet 43, first pole-piece 45, first spacer 47, second pole-piece 46, and magnetic fluid 44 which have similar dimension, arrangement, composition, and function as magnet 13, first pole-piece 15, spacer 17, second pole-piece 16 and magnetic fluid 14 of seal 10, respectively. Seal 40 is further comprised of a conventional magnetically permeable bearing assembly 49 disposed axially adjacent surface 43S of magnet 43 and separated therefrom from a annular, magnetically permeable spacer 48. In the preferred embodiment, bearing assembly 49 is mechanically coupled to the wall of housing 41 and has a movable contacting relationship with shaft 42. Spacer 48 rests at the outer bearing ring along the wall of housing 41 and has an axial length of between 0.005 inches and 0.020 inches. Bearing assembly 49 and spacer 48 assist in reducing the magnetic flux leakage between shaft 42 and surface 43S of magnet 43, thereby increasing the relative seal pressure capacity at gap 2.

In magnetic fluid seals 10, 20, 30 and 40, shown in FIGS. 1, 2, 3, and 4, respectively, the inner-diameter of the annular magnet is greater than the inner-diameter of the first pole-piece adjacent the magnet. In conventional magnetic fluid seals, the magnetic fluid comes into contact with the magnet/pole-piece interface, requiring the magnet to be hermetically bonded to the pole-piece to prevent fluid loss at the interface due to combined magnetic and capillary effects. In the present invention, the magnetic fluid does not come into contact with the magnet/pole-piece interface or the pole-piece/spacer interfaces, therefore, the elements of the magnetic seal assemblies of the present invention are not required to be hermetically bonded together.

Figure 5:
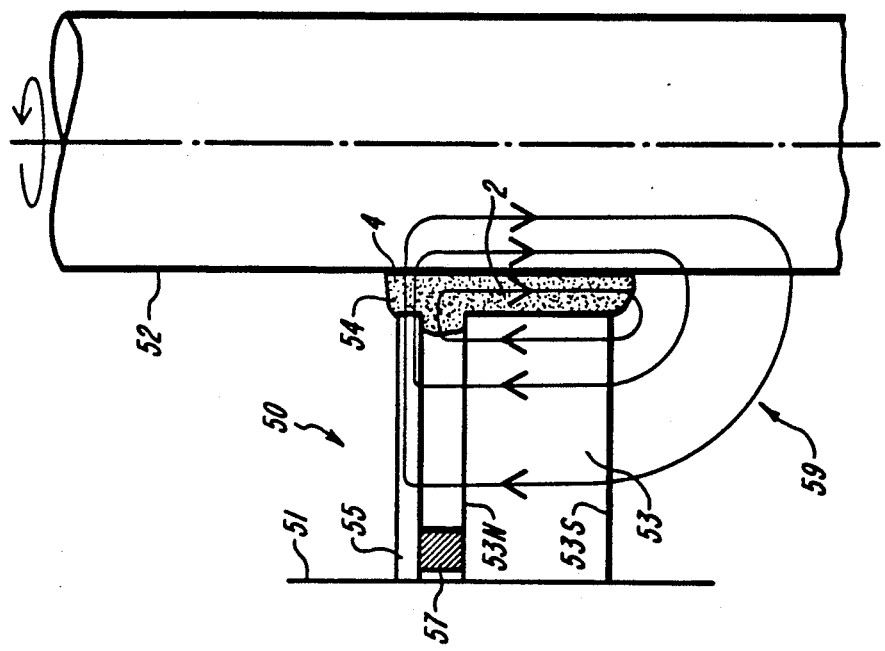
FIG. 5 is one half of a cross sectional view of a stacked, single-pole magnetic fluid seal in accordance with a second embodiment of the present invention.

A second embodiment of the present invention, magnetic fluid seal 50, is shown in FIG. 5. It should be understood that magnetic fluid seal 50 is axially symmetric about axis 8. Seal 50 is coupled between housing 51 and magnetically permeable shaft 52. Magnetic seal 50 is comprised of magnet 53, pole-piece 55, spacer 57, and magnetic fluid 54. As with the first embodiment of the present invention, magnet 53 is an annular, axially polarized, permanent magnet having poles of opposite polarity at surfaces 53N and 53S thereof. Magnet 53 is axially aligned with shaft 52 as illustrated. The outer-diameter surface of magnet 53 is mechanically coupled to the wall of housing 51. The inner diameter surface of magnet 53 is in a closely spaced, non-contacting relationship with shaft 52 to define a radial gap 2 therebetween. In the preferred embodiment, magnet 53 has similar dimensions and composition to magnet 13 of seal 10.

A fist annular, magnetically permeable pole-piece 55 is positioned axially adjacent surface 53N of magnet 53 and is separated therefrom by an annular, non magnetic spacer 57, which defines an intermediate air gap between the pole-piece and magnet. Spacer 57 is preferably positioned along the outer diameters of the pole-piece and the magnet. The outer-diameter of pole-piece 55 is mechanically coupled to housing the wall of 51. Pole piece 55 is in a closely-spaced, non-contacting relationship with shaft 52 to define a radial gap 4 therebetween. Pole-piece 55 is similar in dimensions and function to pole-piece 15 of seal 10. Spacer 57 is similar in dimensions and composition to spacer 17 of seal 10.

Radial gaps 2 and 4 as well as the intermediate gap between magnet 53 and pole-piece 55, collectively form an annular space in which magnetic fluid 54 is disposed and retained. As illustrated, magnetic fluid 54 occupies radial gaps 2 and 4 and partially occupies the intermediate gap between magnet 53 and pole-piece 55. Magnetic fluid 54 is similar in composition and characteristics to magnetic fluid 14 of seal 10. Magnetic fluid 14 is retained in the annular gap by the magnetic flux path which extends between seal 50 and shaft 52, as indicated by magnetic flux lines 59. The volume of magnetic fluid 54 which is retained in the annular space of seal 50 is greater than that maintained by conventional magnetic fluid seals having an unstacked pole-piece, due to the presence of magnetic fluid in the intermediate gap between magnet 53 and pole-piece 55.

As with magnetic fluid seal 10 and 20, the magnetic circuit of seal 50 is not incomplete, with magnetic flux leakage occuring between shaft 52 and surface 53S of magnet 50. The magnetic circuit may be partially completed by attaching a second pole-piece, similar to pole-piece 55, axially adjacent surface 53S of magnet 53.

Figure 6:
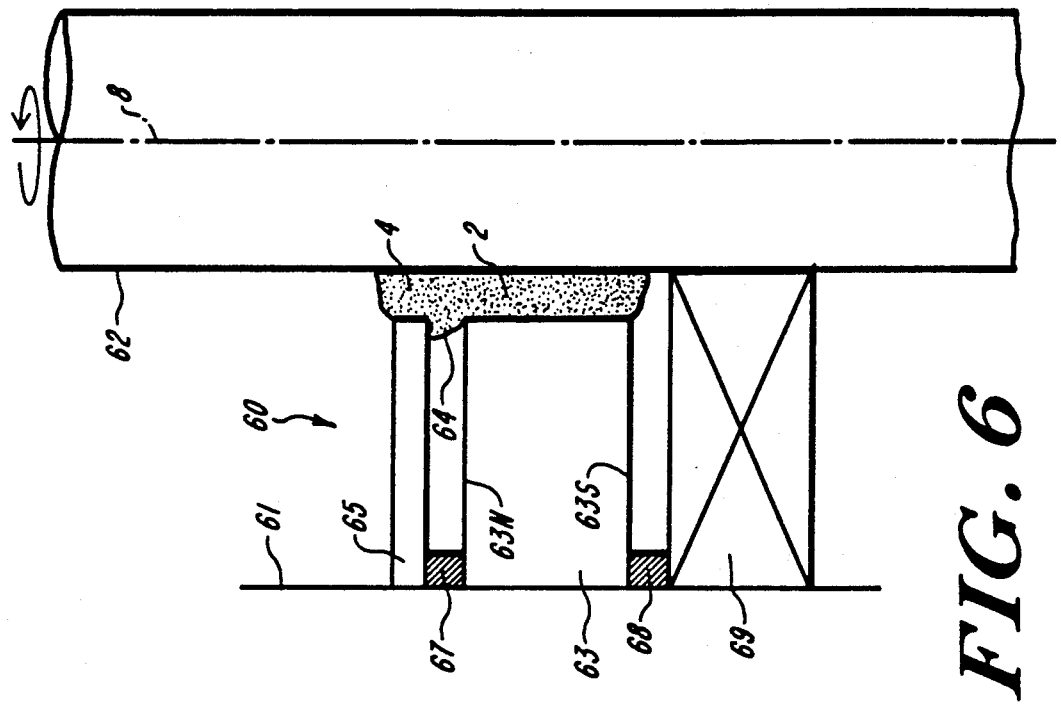
FIG. 6 is one half of a cross sectional view of the magnetic fluid seal of FIG. 5 in which a bearing assembly and spacer are utilized to reduce magnetic flux leakage.

Alternatively, the magnetic circuit of seal 50 may be partially completed in applications utilizing a magnetically permeable bearing assembly as illustrated by seal 60 of FIG. 6. Seal 60 is coupled intermediate housing 61 and shaft 62. Seal 60 is comprised of magnet 63, spacer 67, pole-piece 65 and magnetic fluid 64 which are similar in dimension, arrangement, composition and function to magnet 53, spacer 57, pole-piece 55 and magnetic fluid 54 of seal 50, respectively. Seal 60 further comprises a magnetically permeable bearing assembly 69 positioned axially adjacent surface 63S of magnet 63 and separated therefrom by a second annular space 68. Bearing assembly 69 is mechanically coupled to the wall of housing 61 along its outer diameter and has a movable, contacting surface with shaft 62. A second spacer 68 is similar in dimension to first spacer 67 and is comprised of a magnetically permeable material. Spacer 68 has an axial length of between 0.005 inches to 0.020 inches and rests along the outer bearing ring. Bearing assembly 69 and second spacer 68 assist in completing the magnetic circuit from shaft 62 to seal 60.

As outlined above, the magnetic fluid seals of the present invention are capable of holding relatively large volumes of magnetic fluid with seal life expectancy extended 2 to 4 times that of prior art magnetic fluid seal life.

An electrically conducting or a non conducting magnetic fluid may be used in any of the seals of the present invention. Accordingly, all of the seals may be used for grounding of an electrostatic charge build up at the rotating disk of a disk drive spindle by the use of an electrically conducting magnetic fluid. The electrical resistance of the seals of the present invention are generally lower than conventional prior art seals due to the increased volume of magnetic fluid and because more than one element per seal is engaged in sealing between the housing and shaft. For example, in seals 10 and 20, two or more pole-pieces are used as the sealing elements. In seals 50 and 60, a single pole-piece and the magnet are used as the sealing elements. These multiple sealing element configurations offer a parallel resistance path, thereby reducing the overall seal resistant.

In seals 50 and 60 where the magnetic fluid fills the radial gap intermediate the magnet and the shaft, the magnet should be electrically conducting and typically comprised of Alnico, Sm—Co or Nd—Fe—B compounds. Furthermore, the seal assembly along its outer diameter should be mechanically as well as electrically coupled to the metallic housing wall. An electrical connection may be achieved between the seal assembly and the housing wall by such means as silver print or conducting epoxy. Additionally, spacer 68 of seal 60 is preferably comprised of a metallic substance such as aluminum or bronze. If a non-electrically conducting substance such as plastic is used for spacer 68, suitable means should be used to connect the stacked elements of the seal electrically through the spacer, such as conducting epoxy, metallic wire, or silver print.

The meniscus of the magnetic fluid retained in the seals of the present invention is relatively low, thereby substantially reducing the possibility of magnetic fluid splash due to high rotational speeds of the magnetically permeable shaft. Further, the static pressure capacity of the seals of the present invention changes minimally over extended periods of time partially due to minimal fluid loss at the magnet/pole-piece interface.

In addition, the magnetic fluid seals of the present invention provide a convenient and accurate way of activating the gaps of one or more pole-pieces with magnetic fluid. Due to the magnetic flux gradient present in the seal, the magnetic fluid is automatically drawn towards the pole-piece axially abutting the magnet.

Having thus described a number of embodiments of the present invention, various alterations, modifications and improvements will readily occur to those skilled in the art. Such alterations, modifications and improvements as are made obvious by this disclosure are intended to be par of this disclosure though not expressly stated herein, and are intended to be in the spear and scope of the invention. Accordingly, the foregoing description is intended to be exemplary only and not limiting. The invention is limited only as defined in the following claims and equivalence thereto.

What is claimed:

1. In a magnetic fluid seal for sealing between a housing and a magnetically permeable shaft, said seal having:
    an annular magnet having poles of opposite polarity at first and second surfaces thereof, said magnet having a closely-spaced, non-contacting relationship with said shaft;
    an annular, magnetically permeable primary pole-piece axially abutting the first surface of said magnet, said pole-piece having a closely-spaced, non-contacting relationship with said shaft to define a primary gap; and
    a magnetic fluid disposed and retained in said primary gap, said magnetic fluid forming a magnetic O-ring seal about said shaft, the improvement comprising:
    at least one annular, magnetically permeable secondary pole-piece disposed axially adjacent said primary pole-piece and separated from said primary pole-piece by a non-magnetic spacer to define an intermediate space therebetween, said secondary pole-piece having a closely-spaced, non-contacting relationship with said shaft to define a secondary gap;
    said primary and secondary gaps and said space therebetween collectively defining an annular ring in which said magnetic fluid is disposed and retained.

2. In a magnetic fluid seal apparatus the improvement according to claim 1 further comprising:
    means for reducing magnetic flux leakage between said shaft and the second surface of said magnet.

3. In a magnetic fluid seal apparatus the improvement according to claim 2 where said magnetic flux leakage reduction means comprises an additional, annular, magnetically permeable pole-piece axially abutting the second surface of said magnet, said additional pole-piece having a closely-spaced, non-contacting relationship with said shaft to define a gap therebetween.

4. In a magnetic fluid seal apparatus the improvement according to claim 2 where said magnetic flux reduction means comprises a magnetically permeable bearing assembly axially disposed adjacent the second surface of said magnet, said bearing assembly having a contacting relationship with said shaft.

5. In a magnetic fluid seal apparatus the improvement according to claim 4 where said bearing assembly is separated from the second surface of said magnet by an annular, magnetically permeable spacer axially disposed therebetween.

6. In a magnetic fluid seal for sealing between a housing and a magnetically permeable shaft, said seal having:
    an annular magnet means having poles of opposite polarity at first and second surfaces thereof, a portion of said magnet means having a closely-spaced, non-contacting relationship with said shaft to define a first gap therebetween;
    an annular, magnetically permeable pole-piece disposed axially adjacent the first surface of said magnet means said pole-piece having a closely-spaced, non-contacting relationship with said shaft to define a second gap therebetween; and
    a magnetic fluid disposed and retained in said first and second gaps, said magnetic fluid forming a magnetic O-ring seal about said shaft, the improvement comprising:
    an annular spacer disposed intermediate said magnet means and said pole-piece and defining an intermediate space therebetween,
    said magnetic fluid being disposed and retained in an annular ring formed collectively by said first and second gaps, and said intermediate space.

7. In a magnetic fluid seal apparatus the improvement according to claim 6 further comprising:
    means for reducing magnetic flux leakage between said shaft and the second surface of said magnet.

8. In a magnetic fluid seal apparatus the improvement according to claim 7 where said magnetic flux reduction means of claim 5 comprises a magnetically permeable bearing assembly axially disposed adjacent the second surface of said magnet, said bearing assembly having a contacting relationship with said shaft.

9. In a magnetic fluid seal apparatus the improvement according to claim 8 where said bearing assembly is separated from the second surface of said magnet by an annular, magnetically permeable spacer axially disposed therebetween, said magnetically permeable spacer having a non-contacting relationship with said shaft.

10. A magnetic fluid seal apparatus for sealing between a housing and a magnetically permeable shaft, said seal comprising:
    an annular magnet having poles of opposite polarity at first and second surfaces thereof, said magnet having a closely-spaced, non-contacting relationship with said shaft defining a primary gap;
    a first annular, magnetically-permeable pole-piece axially abutting the second surface of said magnet, said pole-piece having a closely-spaced, non-contacting relationship with said shaft defining a second gap;

a first annular spacer axially abutting said pole-piece, said surface having a non-contacting relationship with said shaft defining a first intermediate space;

a second annular, magnetically permeable pole-piece axially abutting said first spacer, said second pole-piece having a closely-spaced, non-contacting relationship with said shaft defining a third gap; and a magnetic fluid disposed and retained in an annular ring formed by said second and third gaps, and said first intermediate space.

11. The magnetic fluid seal apparatus of claim 10 further comprising a third annular, magnetically permeable pole-piece axially abutting the first surface of said magnet, said third pole-piece having a closely spaced, non-contacting relationship with said shaft.

12. The magnetic fluid seal apparatus of claim 10 further comprising:

a magnetically permeable bearing assembly, axially abutting the first surface of said magnet, said bearing assembly having a contacting relationship with said shaft.

13. The magnetic fluid seal apparatus of claim 12 in which said magnetically permeable bearing assembly is separated from the first surface of said magnet by an annular magnetically permeable spacer axially disposed therebetween.

14. The magnetic fluid seal apparatus of claim 10 further comprising:

a second annular spacer axially abutting said second pole-piece, said second spacer having a non-contacting relationship with said shaft defining a second intermediate space;

a third annular, magnetically permeable pole-piece axially abutting said second spacer, said third pole-piece having a closely-spaced, non-contacting relationship with said shaft defining a fourth gap;

said fourth gap and said second intermediate space further defining said annular ring, in which said magnetic fluid is disposed and retained.

15. A magnetic fluid seal apparatus for sealing between a housing and a magnetically permeable shaft, said seal comprising:

an annular magnet means having poles of opposite polarity at first and second surfaces thereof, a portion of said magnet means having a closely-spaced, non-contacting relationship with said shaft to define a first gap;

a first annular, spacer axially abutting the second surface of said magnet means, said spacer having a non-contacting relationship with said shaft defining a first intermediate space;

a first annular, magnetically permeable pole-piece axially abutting said spacer, said pole-piece having a closely-spaced, non-contacting relationship with said shaft to define a second gap; and a magnetic fluid disposed and retained in an annular ring formed by said first and second gaps and, said first intermediate space.

16. The magnetic fluid seal apparatus of claim 15 further comprising:

a magnetically permeable bearing assembly, axially abutting the first surface of said magnet, said bearing assembly having a contacting relationship with said shaft.

17. The magnetic fluid seal of claim 16 in which said bearing assembly is separated from the first surface of said magent by a magnetically permeable annular spacer axially disposed therebetween.

* * * * *